United States Patent [19]

Thomas

[11] 4,233,866
[45] Nov. 18, 1980

[54] TOOL FOR, AND A METHOD OF, EFFECTING A ROTARY TURNING OPERATION

[75] Inventor: Roland M. Thomas, Birmingham, England

[73] Assignee: Lucas Industries Limited, Brimingham, England

[21] Appl. No.: 32,734

[22] Filed: Apr. 24, 1979

Related U.S. Application Data

[63] Continuation of Ser. No. 831,926, Sep. 9, 1977, abandoned.

[30] Foreign Application Priority Data

Sep. 21, 1976 [GB] United Kingdom ............... 39027/76

[51] Int. Cl.$^2$ ............................ B23B 1/00; B23B 3/00
[52] U.S. Cl. ......................... 82/1 C; 82/2 R; 407/7
[58] Field of Search ....................... 82/1 C, 2 R; 407/7

[56] References Cited

U.S. PATENT DOCUMENTS

| | | | |
|---|---|---|---|
| 2,341,668 | 2/1944 | Staples | 82/2 R |
| 2,689,498 | 9/1954 | Johnson | 407/7 X |
| 3,063,132 | 11/1962 | Binns | 407/103 X |
| 3,515,029 | 6/1970 | Gambini | 407/7 X |

FOREIGN PATENT DOCUMENTS

| | | | |
|---|---|---|---|
| 212871 | 7/1908 | Fed. Rep. of Germany | 407/7 |
| 166 | of 1868 | United Kingdom | 407/7 |

*Primary Examiner*—Leonidas Vlachos
*Attorney, Agent, or Firm*—Holman & Stern

[57] ABSTRACT

To effect a rotary turning operation on workpiece, the workpiece is rotatably driven and a tool tip, which is mounted for rotational movement relative to the carrier, is brought into engagement with the rotating surface of the workpiece to remove material therefrom. A tool for effecting such an operation comprises a spindle supported by the carrier for rotational movement about the axis of the spindle, means for clamping the tool tip at one end of the spindle and means for applying an adjustable force between the spindle and the carrier to prevent the spindle being, in use, rotated about its axis by the frictional torque imparted by the rotating workpiece. There is also provided means for connecting the spindle to an external drive mechanism so that said spindle can be positively driven to rotate about its axis relative to the carrier.

4 Claims, 1 Drawing Figure

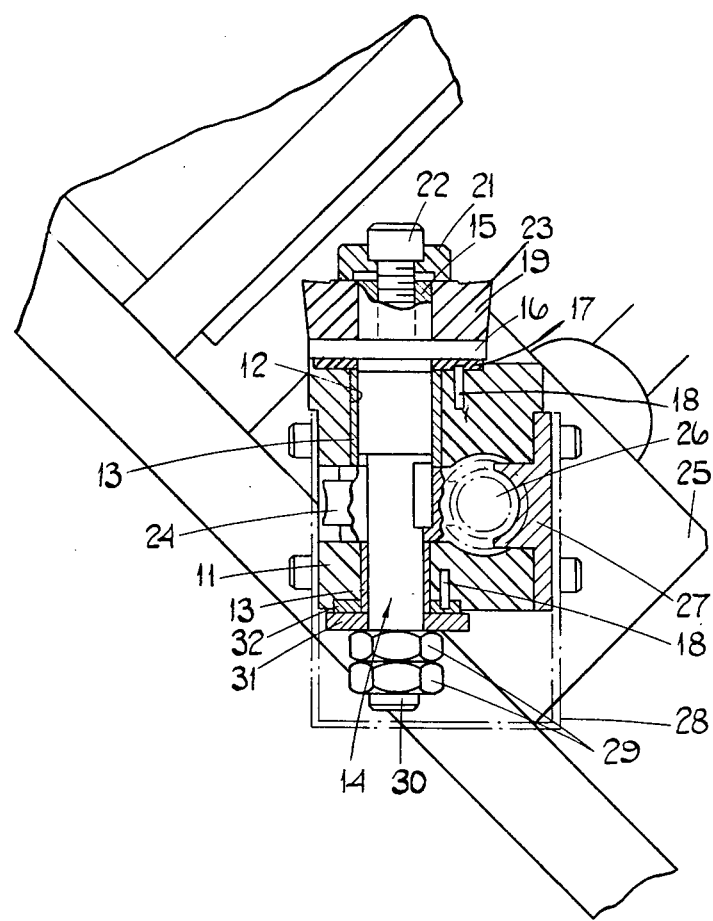

TOOL FOR, AND A METHOD OF, EFFECTING A ROTARY TURNING OPERATION

This is a continuation of application Ser. No. 831,926, filed Sept. 9, 1977, now abandoned.

This invention relates to a tool for, and a method of, effecting a rotary turning operation of the kind in which a workpiece is rotatably driven and a tool tip, which is mounted for rotational movement relative to a carrier, is brought into engagement with the rotating surface of the workpiece to remove material therefrom.

In one aspect, the invention resides in a tool for effecting a rotary turning operation of the kind specified, comprising a spindle supported by the carrier for rotational movement about the axis of the spindle, means for clamping the tool tip at one end of the spindle, means for applying an adjustable force between the spindle and the carrier to prevent the spindle being, in use, rotated about its axis by the frictional torque imparted by the rotating workpiece, and means for connecting the spindle to an external drive mechanism so that said spindle can be positively driven to rotate about its axis relative to the carrier.

Preferably, said force applying means includes a screw-threaded member engaged with a complementarily screw-threaded portion of the spindle and movable to urge respective portions of the spindle and the carrier axially towards each other to compress a thrust bearing.

Preferably, said means for connecting the spindle to a drive mechanism includes a worm wheel rigidly secured to the spindle.

In a further aspect, the invention resides in a method of effecting a rotary turning operation of the kind specified comprising the steps of exerting a restraining force on the tool tip sufficient to prevent the tool tip being rotated by the frictional torque imparted thereto by the rotating workpiece, and at the same time positively driving said tool tip at a rotational speed below the speed at which the tip would be rotated by the workpiece in the absence of said restraining force.

Preferably, said tool tip is formed, at least at its cutting edge, of tungsten carbide, silicon nitride or a ceramic product containing at least 80% by volume of a substituted silicon nitride. In this respect, it is to be appreciated that the term "substituted silicon nitride" is used throughout the present specification to mean a single phase compound having a β-phase silicon nitride lattice in which the silicon and nitrogen atoms in the lattice have been partially replaced by other elements, particularly, but not exclusively, aluminium and oxygen respectively.

The accompanying drawing is a sectional view of a rotary turning tool according to one example of the invention.

Referring to the drawing, the tool includes a steel carrier 11 which is provided with an integral mounting flange 25 to allow the tool to be mounted on a rotary turning machine. Formed in the carrier 11 is a through-bore 12 which receives a pair of spaced steel backed bearing bushes 13, each of which has a bearing surface composed of a mixture of p.t.f.e. and lead. Rotatably mounted in the bushes 13 is a hardened, low-carbon steel spindle 14 which, adjacent one end 15, 14 projects from the carrier 11 and is formed integrally with an annular collar 16 which at one major surface engages a thrust washer 17. The washer 17 is keyed to the carrier 11 by dowels 18 and, as in the case of the bush 13, has a p.t.f.e. and lead bearing surface, the latter being presented to the collar 16.

Seated on the other major surface of the collar 16 is a tool tip 19 which is clamped to the end 15 of the spindle 14 by a hardened, low carbon steel retaining member 21 held captive by a screw 22. The tip 19 is in the form of the frustum of a right cone provided with a centrally disposed bore for receiving the spindle 14 and having its curring edge 23 defined between side and end surface of the cone mutually inclined at an acute angle of between 80° and 85°. The tip 19 is formed from tungsten carbide, or hot pressed silicon nitride or a hot pressed ceramic product containing at least 80% by volume of a substituted silicon nitride.

Rigidly mounted intermediate the ends of the spindle 14 is a worm wheel 24 which, in use, is drivingly connected to an external motor (not shown) by a worm shaft 26 extending through a bore in the flange 28. Releasably secured to the carrier 11 adjacent the worm wheel 24 is a bearing member 27 which is carried by a bracket 28 and which is arranged to receive a plain end of the shaft 26 when the shaft is in meshing engagement with the wheel 24. In addition, the arrangement is such that removal of the member 27 from the carrier 11 allows the shaft 26 to be pivoted out of meshing engagement with the wheel 24 so disconnecting the drive from the motor 25 to the spindle 14.

At its end remote from the collar 16, the spindle 14 is formed with an externally screw-threaded portion 30 which extends from the carrier 11 and which receives a pair of complementary lock nuts 29. Interposed between the nuts 29 and the carrier 11 is a washer 31 which at its surface remote from the nuts 29 engages a thrust washer 32. The washer 32 is formed of the same material as the washer 17 and is secured to the carrier 11 by further dowels 18.

In use, when the tool described above is to be set up to perform a turning operation on a rotating workpiece, the nuts 29 are tightened on the spindle 14 to compress the thrust washers 17, 32 between the carrier 11 and the collar 16 and washer 31 respectively. This is continued until the compressed thrust washers exert a restraining force on the spindle 14 and tool tip 19 which is just sufficient to overcome the frictional torque which will be applied to the tool tip and spindle when the tool tip 19 is brought into engagement with the rotating surface of the workpiece. In this respect, it is to be appreciated that the setting of the nuts 29 will normally be achieved by trial and error with the tool tip 19 being repeatedly moved into engagement with the rotating workpiece, as the nuts are gradually tightened, until the spindle 14 and tool tip 19 are held against rotation with the workpiece. The motor 25 is energised to drive the spindle 14 and tool tip 19 against the restraining action of the compressed thrust washers. The motor is arranged to drive the spindle in the same direction as the frictional torque applied by the rotating workpiece but at a rotational speed below the notional speed at which the tip 19 and spindle 14 would be rotated by the workpiece in the absence of the restraining force provided by the compressed thrust washers. The latter notional speed is normally referred to in the art as the self-propulsion speed and can readily be calculated from the following formula:

$V_r = V_w \cos i$ $V_w$ = rotational speed of the workpiece $V_r$ = self propulsion speed of the tool tip i = angle of inclination between the rotational axis of the workpiece and the rotational axis of the toop tip.

Thus the motor 25 is energised to drive the spindle 14 at a speed below the self-propulsion speed, whereupon the tool tip 19 is moved into engagement with the rotating surface of the workpiece to effect the required turning operation.

In one practical embodiment, the tool described above was used to perform a turning operation on a cylindrical workpiece formed of E.N.2B steel having a diameter of 3.275" and rotating at a surface speed of 1540 ft/min. The tip 19 was required to effect a cut 0.025" deep and the tool was arranged so that the rotational axis of the spindle 14 and tool tip 19 was inclined at an angle of 45° to the rotational axis of the workpiece so that the theoretical self-propulsion speed of the tool tip was 3327 r.p.m. To provide the required drive to the tool tip during the turning operation, the motor employed was arranged to deliver a torque of 5 lb/ft when rotating the shaft 26 at a speed of 89 r.p.m. The worm gear 24, 26 was arranged to have a reduction ratio of 24:1 so that the torque applied by the spindle 14 was 120 lb/ft and the rotational speed of the spindle was 3.7 r.p.m. The torque applied to the nuts 29 to overcome the frictional force actin on the tool tip 19 during the timing operation was 5 lb.ft.

It is to be appreciated that one conventional rotary turning technique involves positively driving the tool tip and its supporting spindle without the application of any restraining force against the frictional torque applied to the tool tip by the rotating workpiece. Using this known technique, however, it is necessary to arrange that the positive drive to the spindle rotates the spindle and the tool tip at a speed greater than the self-propulsion speed of the tool tip which of course means that the drive motor must be larger than that required in the arrangement of the above example. Moreover, the life of the drive motor in the conventional system is found to be reduced as compared with that of the motor employed in the above example.

I claim:

1. A tool for effecting a rotary turning operation on a rotatably driven workpiece, comprising a tool carrier, a spindle supported by the carrier for rotational movement about the axis of the spindle, a tool tip engagable with the rotating surface of the workpiece to remove material therefrom, clamping means rigidly securing the tool tip at one end of the spindle, means for applying an adjustable force between the spindle and the carrier including a thrust bearing between the spindle and the carrier, said adjustable force preventing the spindle being, in use, rotated about its axis by the frictional torque imparted to the tool tip by the rotating workpiece, a separate drive mechanism for the spindle, and means connecting the spindle to said separate drive mechanism to positively drive said spindle against said force and rotate said spindle about its axis relative to the carrier; said force applying means includes a screw-threaded member engaged with a complementarily screw-threaded portion of the spindle and movable to urge respective portions of the spindle and the carrier axially towards each other to compress said thrust bearing.

2. A tool as claimed in claim 1, wherein said means for connecting the spindle to a drive mechanism includes a worm wheel rigidly secured to the spindle.

3. A method of effecting a rotary turning operation on a rotatably driven workpiece having an axis of rotation, the method comprising the steps of urging a tool tip having an axis of rotation against the rotating surface of the workpiece, said tool tip axis of rotation being at an oblique angle relative to the axis of rotation of the workpiece, exerting a restraining force on the tool tip sufficient to prevent the tool tip being rotated by the frictional torque imparted thereto by the rotating workpiece, and at the time positively driving said tool tip at a rotational speed below the speed at which the tip would be rotated by the workpiece in the absence of said restraining force.

4. A method as claimed in claim 4, wherein said tool tip is formed, at least at its cutting edge, of tungsten carbide, hot pressed silicon nitride or a hot pressed ceramic product containing at least 80% by volume of a substituted silicon nitride.

* * * * *